United States Patent
Drews et al.

(10) Patent No.: US 9,802,483 B2
(45) Date of Patent: Oct. 31, 2017

(54) ACCELERATOR FORCE FEEDBACK PEDAL (AFFP) AS ASSISTANCE SYSTEM FOR DISTANCE CONTROL IN TRAFFIC

(71) Applicant: Conti Temic microelectronic GmbH, Nuremberg (DE)

(72) Inventors: Frank Drews, Roethenbach (DE); Carmelo Leone, Freising (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 45 days.

(21) Appl. No.: 14/967,795

(22) Filed: Dec. 14, 2015

(65) Prior Publication Data

US 2016/0096431 A1   Apr. 7, 2016

Related U.S. Application Data

(63) Continuation-in-part of application No. PCT/DE2014/200281, filed on Jun. 25, 2014.

(30) Foreign Application Priority Data

Jul. 4, 2013  (DE) .................. 10 2013 213 050

(51) Int. Cl.
*B60K 31/02* (2006.01)
*B60W 50/16* (2012.01)
(Continued)

(52) U.S. Cl.
CPC ............ *B60K 31/02* (2013.01); *B60K 26/021* (2013.01); *B60W 50/16* (2013.01);
(Continued)

(58) Field of Classification Search
CPC  B60K 31/02; B60K 26/021; B60K 2026/023; B60W 50/16;
(Continued)

(56) References Cited

U.S. PATENT DOCUMENTS 5,165,497 A * 11/1992 Chi .................... B60K 31/0008
                                            180/169
5,173,859 A * 12/1992 Deering ............. B60K 31/0008
                                            180/271
(Continued)

FOREIGN PATENT DOCUMENTS

DE    32 32 160    3/1984
DE    34 00 560    7/1985
(Continued)

OTHER PUBLICATIONS

International Search Report of the International Searching Authority for International Application PCT/DE2014/200281, dated Feb. 13, 2015, 3 pages, European Patent Office, HV Rijswijk, Netherlands.
(Continued)

*Primary Examiner* — Jerrah Edwards
*Assistant Examiner* — Majdi Alsomiri
(74) *Attorney, Agent, or Firm* — W. F. Fasse

(57) ABSTRACT

A driver of a vehicle applies an actuation force to an accelerator device such as an accelerator pedal or a twist-grip throttle of the vehicle to deflect the accelerator device to an actual deflection angle ($\phi_{act}$), which is detected. A restoring force acts on the accelerator device opposite the actuation force. An electronic controller determines a nominal deflection angle ($\phi_{nom}$) to which the accelerator device shall be deflected, based on inputs such as an actual speed of the subject vehicle, a relative speed of the subject vehicle relative to a leading vehicle driving ahead of the subject vehicle, an actual distance of the subject vehicle to the leading vehicle, and a nominal distance at which the subject vehicle shall follow the leading vehicle. The restoring force on the accelerator device is modulated as a function of the difference between the actual deflection angle ($\phi_{act}$) and the nominal deflection angle ($\phi_{nom}$).

21 Claims, 4 Drawing Sheets

(51) Int. Cl.
*B60K 26/02* (2006.01)
*B60W 30/16* (2012.01)
*B60W 50/00* (2006.01)

(52) U.S. Cl.
CPC ........ *B60K 2026/023* (2013.01); *B60W 30/16* (2013.01); *B60W 2050/0009* (2013.01); *B60W 2520/10* (2013.01); *B60W 2550/302* (2013.01); *B60W 2550/308* (2013.01)

(58) Field of Classification Search
CPC ..... B60W 2050/0009; B60W 2520/10; B60W 30/16; B60W 2550/308; B60W 2550/302
See application file for complete search history.

(56) References Cited

U.S. PATENT DOCUMENTS

| | | | | |
|---|---|---|---|---|
| 5,396,426 | A * | 3/1995 | Hibino | ................... B60W 30/16 123/352 |
| 5,568,797 | A | 10/1996 | Landerretche | |
| 5,825,901 | A | 10/1998 | Hisey | |
| 6,009,368 | A * | 12/1999 | Labuhn | .............. B60K 31/0008 123/352 |
| 6,044,321 | A * | 3/2000 | Nakamura | ......... B60K 31/0008 180/179 |
| 6,154,168 | A | 11/2000 | Egawa et al. | |
| 6,233,516 | B1 * | 5/2001 | Egawa | ............... B60K 31/0008 180/167 |
| 6,273,204 | B1 * | 8/2001 | Winner | .............. B60K 31/0008 180/170 |
| 6,339,740 | B1 * | 1/2002 | Seto | ..................... B60K 31/047 340/904 |
| 6,401,024 | B1 * | 6/2002 | Tange | ................ B60K 31/0008 180/170 |
| 6,493,625 | B2 * | 12/2002 | Andreas | ................. G08G 1/166 180/170 |
| 6,496,108 | B1 * | 12/2002 | Baker | ................ B60K 31/0008 340/436 |
| 6,591,180 | B1 * | 7/2003 | Steiner | ............... B60K 31/0008 180/179 |
| 6,618,000 | B2 * | 9/2003 | Winner | .............. B60K 31/0008 180/167 |
| 6,768,937 | B2 * | 7/2004 | Andreas | ............. B60K 31/0008 180/170 |
| 6,934,614 | B2 | 8/2005 | Yamamura et al. | |
| 7,022,045 | B2 | 4/2006 | Yone | |
| 7,237,453 | B2 | 7/2007 | Kohlen et al. | |
| 7,631,574 | B2 | 12/2009 | Leone | |
| 8,378,531 | B2 | 2/2013 | Noh et al. | |
| 8,401,757 | B2 | 3/2013 | Tokimasa et al. | |
| 8,417,430 | B2 * | 4/2013 | Saeki | ................... B60W 30/17 701/117 |
| 8,820,190 | B2 | 9/2014 | Noh et al. | |
| 8,914,210 | B2 | 12/2014 | Schmitt et al. | |
| 9,182,774 | B2 | 11/2015 | Drews et al. | |
| 2003/0014175 | A1 * | 1/2003 | Andreas | ............. B60K 31/0008 701/70 |
| 2003/0130783 | A1 * | 7/2003 | Hellmann | .......... B60K 31/0008 701/93 |
| 2004/0259687 | A1 | 12/2004 | Ritter et al. | |
| 2006/0109098 | A1 | 5/2006 | Grill et al. | |
| 2007/0240534 | A1 | 10/2007 | Makino | |
| 2009/0276135 | A1 | 11/2009 | Hagemann et al. | |
| 2010/0179741 | A1 * | 7/2010 | Pelosse | ................. B60W 30/16 701/96 |
| 2012/0167708 | A1 | 7/2012 | Brandt et al. | |
| 2013/0047776 | A1 | 2/2013 | Leone et al. | |
| 2015/0143944 | A1 | 5/2015 | Zell et al. | |

FOREIGN PATENT DOCUMENTS

| | | |
|---|---|---|
| DE | 196 20 929 | 11/1997 |
| DE | 197 43 958 | 4/1999 |
| DE | 102 12 674 | 10/2003 |
| DE | 699 13 411 | 10/2004 |
| DE | 103 51 656 | 6/2005 |
| DE | 102004025829 | 12/2005 |
| DE | 102004026407 | 12/2005 |
| DE | 102005026065 | 12/2006 |
| DE | 102007035424 | 1/2009 |
| DE | 102007050504 | 4/2009 |
| DE | 102009056130 | 7/2010 |
| DE | 102010031080 | 3/2011 |
| DE | 102011079375 | 4/2012 |
| EP | 1 426 230 | 6/2004 |
| EP | 1 538 018 | 6/2005 |
| EP | 1 607 263 | 12/2005 |
| EP | 1 720 727 | 11/2006 |
| EP | 2 256 581 | 12/2010 |
| JP | 10-083224 A | 3/1998 |
| WO | WO 2005/105508 | 11/2005 |

OTHER PUBLICATIONS

PCT International Preliminary Report on Patentability including English Translation of PCT Written Opinion of the International Searching Authority for International Application PCT/DE2014/200281, dated Jan. 14, 2016, 12 pages, International Bureau of WIPO, Geneva, Switzerland.

German Search Report for German Patent Application No. 10 2013 213 050.3, dated May 26, 2014, 8 pages, Muenchen, Germany, with English translation, 6 pages.

* cited by examiner

ACCELERATOR FORCE FEEDBACK PEDAL (AFFP) AS ASSISTANCE SYSTEM FOR DISTANCE CONTROL IN TRAFFIC

CROSS-REFERENCE TO RELATED APPLICATIONS

This application is a Continuation-In-Part (CIP) under 35 USC 111(a) and 120 of PCT International Application PCT/DE2014/200281 filed on Jun. 25, 2014. Through the PCT application, the present application also claims priority under 35 USC 119 of German Patent Application DE 10 2013 213 050.3 filed on Jul. 4, 2013. The entire disclosures of the priority application and the PCT application are incorporated herein by reference.

FIELD OF THE INVENTION

The invention relates to a controller, a control system and a method of controlling the restoring force of an accelerator device for motor vehicles. An accelerator device may, for example, be an accelerator pedal, as used in cars or trucks, or a twist-grip throttle as used, for example, on motorcycles or quad bikes or ATVs.

BACKGROUND INFORMATION

In order to actuate such an accelerator device, an actuation force generally has to be applied to the accelerator device. For example, an accelerator pedal must be depressed with the foot, or a twist-grip throttle must be rotated with the hand. If the applied actuation force is sufficiently large, the accelerator device is deflected from a rest position. The degree of the deflection is communicated mechanically or electronically to an engine control unit and converted there into a corresponding engine load or desired power output.

Usually, the accelerator devices described above include means which cause a restoring force to act upon the accelerator devices. The restoring force hereby generally acts counter to the actuation force and in the direction of the starting position of the accelerator device. For example, such a restoring force can be caused by a spring mechanism or electrically by a torque motor which is coupled with the accelerator device. Common restoring mechanisms are configured such that the restoring force is constant over the entire deflection range or increases towards greater deflections of the accelerator device.

The deflection of the accelerator device from the rest position can be described by a deflection angle $\phi$. For example, the deflection angle $\phi$ can be defined such that the deflection angle $\phi$ is equal to zero for the rest position of the accelerator device, whilst the deflection angle for a maximum deflection of the accelerator device is defined as a fixed value. The deflection of the accelerator device can, for example, also be described as a percentage of the maximum deflection. The starting position of the accelerator device corresponds to a deflection of 0%, whilst the maximum deflection of the accelerator device, which is also described as "full throttle", corresponds to a deflection of 100%.

Based on a distance detected by a driving environment sensor, traditional adaptive cruise control systems intervene, if necessary, in the engine control, control the fuel supply in particular and thus, ultimately, control the engine speed and torque of the engine directly and without taking into account or even influencing the position of the manual accelerator device such as the accelerator pedal or the twist-grip throttle.

In addition, WO 2005/105508 already describes the process, with a so-called force feedback pedal, i.e. an accelerator device having a restoring device, of actively influencing the position of the accelerator device which then, of course, also indirectly acts upon the engine control.

In addition, in DE 10 2010 031 080 A1, a controller concept for a device for generating a restoring force on an accelerator pedal is presented, in which a separate controller is provided, in each case, for different operating situations, in particular when following another vehicle as well as for deceleration. Separate controllers make it possible to individually adjust the parameters of the controller and, thus, the latter's control behavior to the respective operating situation, but increase the complexity and expense, even if nowadays controllers are frequently constructed as a software control system, since memory space and computing time also have to be considered in software.

SUMMARY OF THE INVENTION

In view of the above it is an object of embodiments of the invention to provide an improved controller, an accelerator device for a motor vehicle with such a controller, as well as a method of operating it, which can be used as an assistance system for distance control in traffic, among other things. Embodiments of the invention further aim to avoid or overcome the disadvantages of the prior art, and to achieve additional advantages, as apparent from the present specification. The attainment of these objects is, however, not a required limitation of the claimed invention.

One or more of the above objects can be achieved according to one or more embodiments of the invention as set forth herein.

According to one embodiment of the invention, a specified nominal deflection, e.g. a nominal angle $\phi_{nom}$ of the deflection of the accelerator device is determined by a control loop circuit or electronic controller. To this end, a controller is provided which comprises inputs for supplying signals of an actual speed $v_{act}$ of the subject or host motor vehicle, a relative speed $v_{rel}$ of the subject motor vehicle relative to another motor vehicle (e.g. called a leading vehicle) that is driving ahead of the subject motor vehicle, a specified nominal distance $d_{nom}$ from the leading vehicle that is driving ahead, and an actual distance $d_{act}$ from the leading vehicle that is driving ahead. The corresponding sensors are not, as a rule, part of the controller itself, i.e. for example, part of an appropriate electronic controller electronic unit.

In this embodiment, the controller includes a PD controller, in order to generate a first nominal angle contribution on the basis of the difference between the nominal distance $d_{nom}$ and the actual distance $d_{act}$, and a feed-forward control which is parallel to the PD controller, in order to generate a second nominal angle contribution on the basis of the actual speed $v_{act}$, the relative speed $v_{rel}$, and a weighted deviation of the actual distance $d_{act}$ from the nominal distance $d_{nom}$. In addition, a totalizer is provided, in order to determine the nominal angle from at least these two nominal angle contributions.

The controller can be embodied or constructed and configured as a controller electronic unit which is separate from the controlling element or which is structurally integrated in the controlling element and accordingly can, if necessary, be handled separately.

In a preferred configuration, the controller is also configured to detect the amount of a deviation in the distance control (u) as the difference between the nominal distance ($d_{nom}$) and the actual distance ($d_{act}$) and in the event of a threshold of this deviation in the distance control (u) being exceeded, to increase the amount of the nominal angle ($\phi_{nom}$) by a third nominal angle contribution, if the amount of a deviation in the distance control (u) is negative, or to reduce it, if the amount of a deviation in the distance control (u) is positive. It is therefore possible to intervene with higher control dynamics in the event of greater deviations in the distance control.

In a further preferred configuration or embodiment, the controller is also configured, when the motor vehicle is traveling at a low speed ($v_{act}$) and a short distance ($d_{act}$) from the motor vehicle that is driving ahead, as occurs when first starting to drive or moving off from a standstill, to increase the amount of the nominal angle ($\phi_{nom}$) by means of the additional nominal angle contribution. Here as well, another controller is not completely active in the particular traffic situation, but merely an additional nominal angle contribution.

In a particularly preferred configuration or embodiment, the above two concepts are combined with one another such that the feedback is integrated, in that the total of the other nominal angle contributions is fed back to the unit for generating the third nominal angle contribution, as an additional input variable, and said unit determines the third nominal angle contribution as a function of the deviation in the distance control (u) and the other nominal angle contributions.

In addition, in order to carry out the method in the entire system, the actual deflection $\phi_{act}$ of the accelerator device is also determined, for example, by suitable sensors. The restoring force on the accelerator device is then modulated as a function of the difference between the actual deflection $\phi_{act}$ and the nominal angle $\phi_{nom}$. A restoring force can be both a force and a torque.

The nominal angle $\phi_{nom}$ can, for example, be determined such that the engine load of the motor vehicle is adjusted by a deflection of the accelerator device toward this angle $\phi_{nom}$ so as to avoid the possibility of falling short of a pre-specified safety distance of the motor vehicle from a motor vehicle that is driving ahead. The restoring force on the accelerator device can, for example, be modulated such that the restoring force on the accelerator device remains constant for a deflection of the accelerator device, which is less than the nominal angle $\phi_{nom}$. If, however, the actual deflection $\phi_{act}$ exceeds the nominal angle $\phi_{nom}$, the restoring force on the accelerator device increases considerably. The vehicle driver would therefore have to apply a significantly increased actuation force on the accelerator device for a further actuation of the accelerator device beyond the nominal angle $\phi_{nom}$. The increased application of force would, however, be consciously or subconsciously perceived by the vehicle driver, so that haptic feedback and/or a signal is transmitted to the vehicle driver as a result of the previously described modulation of the restoring force on the accelerator device. The vehicle driver is, however, free to deflect the accelerator device further by further increasing the actuation force, in order to increase the engine load, for example in order to initiate an overtaking maneuver.

The modulation of the restoring force on the accelerator device can, in addition, be so pronounced that shortly before attaining the nominal angle $\phi_{nom}$ the restoring force on the accelerator device is reduced, and is considerably increased on attaining the nominal angle $\phi_{nom}$. The aforementioned haptic feedback would be more easily perceived by the vehicle driver as a result of such a depression in the force curve of the restoring force.

It is also possible that the modulation of the restoring force is designed such that the vehicle driver perceives a vibration of the accelerator device, if the nominal angle $\phi_{nom}$ is exceeded. As a result of this, the vehicle driver would be informed that there is a risk of falling short of the nominal distance very considerably.

It should be noted that the steps of the method of determining a nominal angle $\phi_{nom}$, determining an actual deflection $\phi_{act}$ and modulating the restoring force on the accelerator device as a function of the difference between the actual deflection $\phi_{act}$ and the nominal angle $\phi_{nom}$ according to the invention are carried out time and time again at very short intervals, as a result of which the restoring force of the accelerator device is continually controlled.

The previously described method is particularly advantageous, as the problem with modern motor vehicles is frequently that the vehicle driver is presented with a multitude of information. This can result in a sensory overload for the vehicle driver through acoustic and visual signals, as a result of which the vehicle driver can be distracted from what is actually happening when driving the vehicle in traffic. As a result, the vehicle driver has a tendency to no longer perceive some of the signals or he is no longer able to assign them properly. This problem is solved by the method according to the invention, since the information is transmitted to the vehicle driver by the transmission of haptic signals which can be perceived subconsciously by the vehicle driver and therefore do not or only very slightly affect the perception of other signals.

In addition, it is advantageous, particularly given the increasing volume and density of traffic, to automatically control the distance from a vehicle that is driving ahead in the vehicle control system, without the need for visual or acoustic signals. In particular, in stressful traffic situations such as, for example, dense traffic at peak times, additional visual or acoustic signals could result in other information being overlooked or misinterpreted. It is therefore advantageous to assist the driver in the selection of an optimum distance from a vehicle that is driving ahead by means of clear, haptic information via the motor vehicle's accelerator device.

According to one embodiment of the invention, the control loop determines the nominal angle on the basis of a speed $v_{act}$ of the motor vehicle, a relative speed $v_{rel}$ of the motor vehicle to a motor vehicle that is driving ahead, a nominal distance $d_{nom}$ from the motor vehicle that is driving ahead and an actual distance $d_{act}$ from the motor vehicle that is driving ahead. The advantage of this is that all of the aforementioned variables can be determined with low technical outlay (e.g. effort and/or expense). The actual speed $v_{act}$ of the motor vehicle can thus be determined by a speedometer which is usually found in every motor vehicle. The distance of the motor vehicle from a motor vehicle that is driving ahead $d_{act}$ can be determined, for example, by a distance radar. The relative speed $v_{rel}$ of the motor vehicle to a motor vehicle that is driving ahead can be determined from the change in the distance $d_{act}$ over time. The nominal distance $d_{nom}$ is a freely definable variable. The nominal distance can, for example, be determined according to the regulations of the prevailing jurisdiction as a function of the speed $v_{act}$ of the motor vehicle or by a selected driving mode of the motor vehicle.

In a further aspect, this invention relates to a control system for a motor vehicle having:
  an accelerator device, wherein the accelerator device is, for example, an accelerator pedal or a twist-grip throttle, and wherein the accelerator device can be deflected from a starting position by the application of an actuation force to the accelerator device, a deflection sensor, wherein the deflection sensor can generate a deflection signal, from which the actual deflection $\phi_{act}$ of the accelerator device can be determined, a restoring mechanism, wherein the restoring mechanism can cause a restoring force to act upon the accelerator device, the restoring force acting counter to the actuation force, and an actuator, wherein the actuator is coupled with the accelerator device such that it can modulate the restoring force on the accelerator device by applying an additional restoring or actuation force as a function of the deflection signal. An actuator arrangement may comprise the actuator and the restoring mechanism.

In a further advantageous embodiment of the control system according to the invention, the controller is also configured, in the event of a threshold for the amount of a deviation in the distance control being exceeded, to increase the amount of the nominal angle, if the deviation in the distance control is negative, or to reduce it, if the deviation in the distance control is positive, wherein the deviation in the distance control is set by the difference between the nominal distance and the actual distance.

BRIEF DESCRIPTION OF THE DRAWINGS

Embodiments of the invention are explained in more detail below, with reference to the drawings, wherein.

Figure 1:
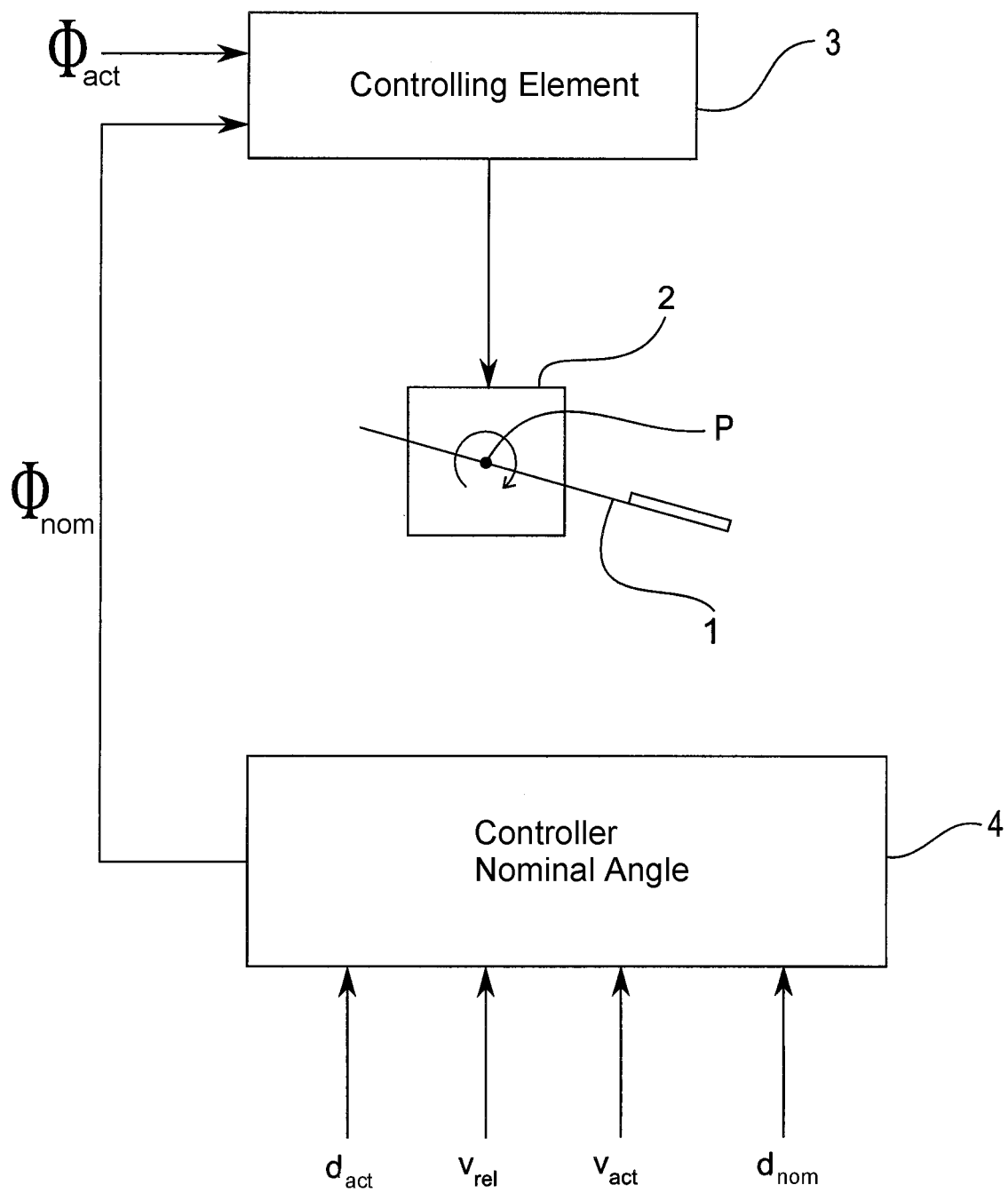
FIG. 1 shows a block diagram of a control system according to an embodiment of the invention, for operating or controlling an accelerator device in a motor vehicle.

DETAILED DESCRIPTION OF PREFERRED EXAMPLE EMBODIMENTS AND THE BEST MODE OF THE INVENTION

Elements of the following embodiments, which correspond to one another or which are identical, are in each case identified below with the same reference numerals.

FIG. 1 shows a block diagram of a control system according to an embodiment of the invention. In the illustrated embodiment, the accelerator device 1 is an accelerator pedal as is used, for example, in cars and trucks. The accelerator pedal shown is a so-called suspended accelerator pedal unit. In principle, the method described here can, however, also be applied to so-called stationary accelerator pedal units or twist-grip throttles.

Figure 2:
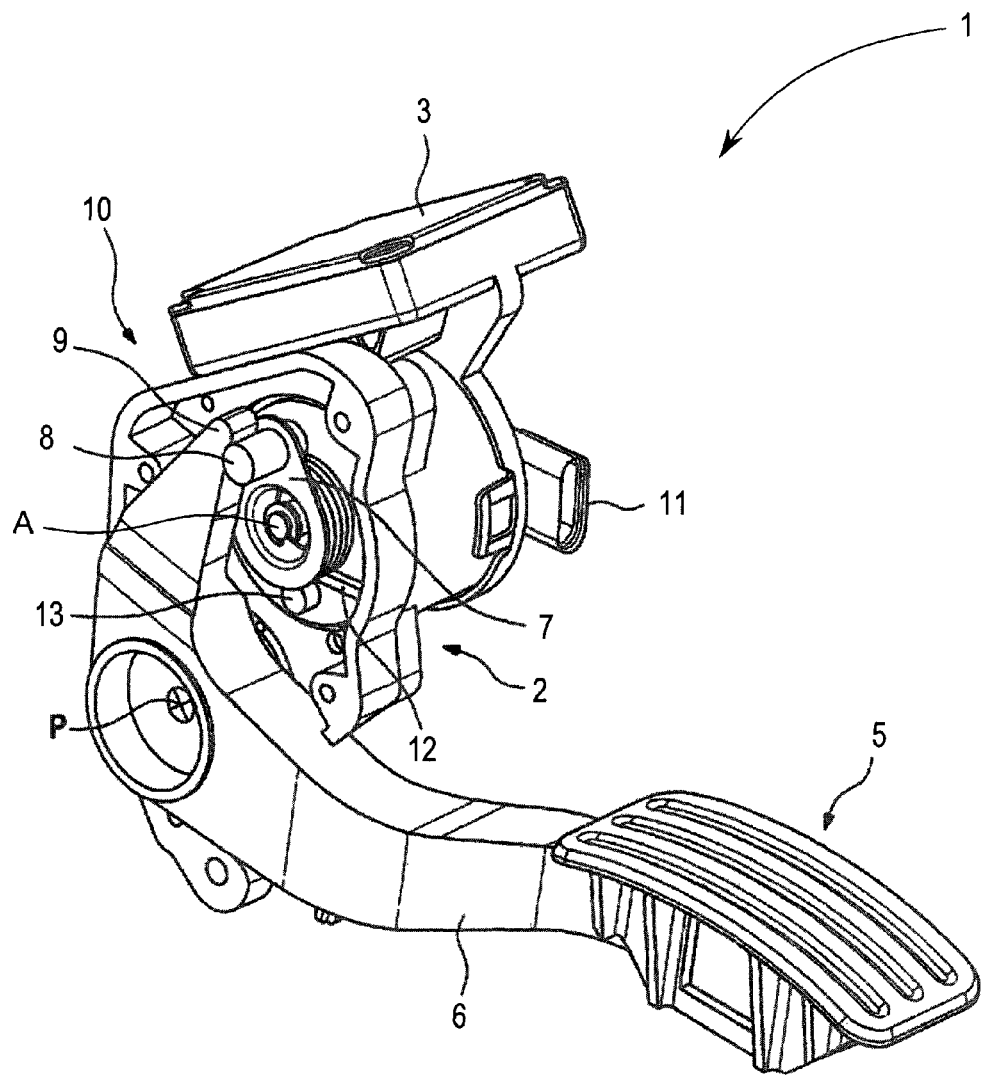
FIG. 2 shows a schematic representation of an accelerator device which is suitable for use in connection with the method according to an embodiment of the invention.

FIG. 2 is a schematic view of an accelerator device, on which the method according to the invention can be performed. The accelerator device 1 shown in FIG. 2 is an accelerator pedal as used, for example, in cars or trucks. A pedal pad 5 is rotatably supported at a pivot point P via a pedal lever 6. The pedal lever 6 can be deflected downwards by applying pressure to the pedal pad 5. If the pedal lever is deflected from a zero position, a pedal return spring (not shown) causes a restoring force to be applied to the pedal lever 6, so that the latter is biased to urged to be pivoted back into its starting position by the pedal return spring, if the pedal pad 5 is not actuated. The pedal return spring can, for example, be configured as a leg spring.

The accelerator pedal 1 is rotatably supported about a pivot point P. In addition, the accelerator pedal 1 is connected to an actuator 2 such that the actuator 2 can exert a force on the accelerator pedal 1. The actuator 2 is connected to an actuating or controlling element 3 such that the controlling element 3 can control the force exerted by the actuator 2 on the accelerator pedal 1, for example by appropriate energization, if the actuator is an electro-mechanical actuator such as, for example, a torque motor.

The actuating or controlling element 3 uses the input variable $\phi_{act}$, i.e. the actual deflection angle of the accelerator pedal 1, and the specified or nominal angle of the accelerator pedal 1 $\phi_{nom}$, to control the actuator 2. The specified or nominal angle $\phi_{nom}$ is determined by a controller 4. The controller 4 according to this embodiment of the invention, which is explained in more detail in FIG. 3, determines the nominal angle $\phi_{nom}$ from four input variables:

the actual distance $d_{act}$ of the subject motor vehicle from another vehicle that is driving ahead of the subject vehicle;

the relative speed $v_{rel}$ of the subject motor vehicle relative to the other vehicle that is driving ahead;

the actual speed $v_{act}$ of the subject motor vehicle;

the specified or nominal distance $d_{nom}$ of the subject motor vehicle from the other vehicle that is driving ahead.

The controller can obtain the actual speed of the motor vehicle $v_{act}$, for example from a speedometer of the motor vehicle. The actual distance $d_{act}$ of the motor vehicle from a motor vehicle that is driving ahead can, for example, be determined by a radar sensor. The relative speed $v_{rel}$ of the motor vehicle to a motor vehicle that is driving ahead can be determined from the change in the distance $d_{act}$. The controller 4 can obtain the nominal distance $d_{nom}$ of the motor vehicle from a motor vehicle that is driving ahead, for example, from a signal transmitter. The controller 4 continually determines the nominal angle $\phi_{nom}$ from the four aforementioned input variables during vehicle operation.

The nominal angle $\phi_{nom}$ as well as the actual deflection of the accelerator $\phi_{act}$ are communicated to the controlling element 3. The controlling element 3 determines a signal from the difference between the nominal angle $\phi_{nom}$ and the actual angle $\phi_{act}$, said signal being communicated to the actuator 2 and causing the actuator 2 to modulate the restoring force on the accelerator pedal 1. The actual deflection of the accelerator pedal 1 $\phi_{act}$ can, for example, be detected by an angle sensor and communicated to the controlling element 3.

In addition, the accelerator device 1 includes an actuator 2 which can, for example, be configured as a torque motor. Torque motors are particularly suitable for an accelerator device for carrying out the method according to the invention, since they can provide very high torques. A drive shaft 7 is fixed on the axis of rotation A of the actuator 2. The actuator 2 can exert a force on an arm 9 via the drive shaft 7 by means of a drive roll 8 or other suitable devices such as e.g. moving freeform surfaces, said arm being located in the extension of the pedal lever 6. The actuator 2 is therefore indirectly coupled with the accelerator pedal, such that a force can be transmitted to the accelerator pedal. In the embodiment example described here, the pivot points P and A of the pedal lever 6 and of the actuator 2 are separated in terms of their location. However, an accelerator device is also conceivable, in which the two pivot points P and A coincide.

The previously described elements are integrated in a housing 10. In addition, the accelerator device 1 includes or is combined with the controlling element 3 and an interface 11. As previously explained, the controlling element 3 is configured to control the actuator 2, as a function of the difference between a pedal nominal angle $\phi_{nom}$ and a pedal actual angle $\phi_{act}$, such that the actuator 2 modulates the restoring force on the pedal lever 6 by the application of an additional force.

The interface 11 includes the power supply to the electronics, i.e. for example, the power supply to the electromechanical actuator 2. In addition, the interface 11 is configured to exchange signals between the controlling element 3 and other control devices outside the accelerator device 1 via a communication bus in the motor vehicle such as, for example, a CAN bus.

An actuator return spring 12 is arranged on the actuator 2 such that the drive shaft 7 of the actuator 2 presses the pedal lever 6 in the direction of its zero position by means of the drive roll 8 and, in particular, even if the electromechanical actuator 2 is not energized. One end each of the pedal return spring and the actuator return spring 12 are firmly connected to the housing 10 at least in the pressing direction of the spring, wherein, in the example shown in FIG. 2, the one end of the actuator return spring 12 is attached to the journal 13 of the housing 10. The other end of the pedal return spring acts upon the pedal lever 6 and/or the other end of the actuator return spring 12 acts upon the drive pulley 7. The angle range, which is determined by the respective zero positions and end positions of the two springs (pedal return spring and actuator return spring 12), is greater, in the case of the actuator return spring 12, both with regard to the zero position and with regard to the end position, than in the case of the pedal return spring. It is thus ensured that the drive shaft 7 rests at all times on the arm 9 of the pedal lever 6, via the drive roll 8. The actuator return spring 12 is therefore always biased.

In order to control the actuator 2, in particular by means of the controlling element 10 which is integrated in the accelerator device 1, it is advantageous to detect the angle position a of the actuator 2 by means of a suitable sensor, for example a Hall effect sensor. Suitable sensors are not shown in the figures. Alternatively, by dispensing with the sensor just indicated, it is possible to extrapolate from the position of the pedal lever 6, by means of the controlling element 3, with the aid of suitable software, to the angular position of the actuator 2, if the position of the pedal lever 6 is supplied to the controlling element 3 as a signal. This can happen, for example, by reading in the position of the pedal lever 6 from the vehicle communication bus into the controlling element 3 via the interface 11. Such a software embodiment is also encompassed within the scope of a "deflection sensor" herein, unless expressly excluded.

This method now proposes that the active accelerator device described above be used as an assistance system for controlling the distance between two vehicles driving in traffic.

The distance between two vehicles is generally only constant, if both vehicles are driving at the same speed. Changes in speed caused by braking or accelerating maneuvers modify the distance between the two vehicles. The distance between two vehicles can therefore only be kept approximately constant, if these changes in speed and, therefore, the distance are taken into account in a control concept.

A desired nominal distance $d_{nom}$ from a vehicle that is driving ahead can therefore only be observed and/or adopted, if the speed of the subject vehicle driven by the vehicle driver corresponds to a particular nominal speed $v_{nom}$. This speed $v_{nom}$ correlates with a deflection of the accelerator device 1 to a nominal angle $\phi_{nom}$. The attainment of the nominal angle $\phi_{nom}$ is notified to the driver by the actuator 2, in that with this value, the restoring force on the accelerator device 1 is modulated by controlling the actuator 2 in an appropriate manner. The driver feels this modulation of force with his foot and/or his hand, and it is thus indicated to him that he should not continue to actuate the accelerator device 1, but should retain this position or modify it towards minor deflections. In other words, the modulated restoring force urges the driver to move the accelerator device toward or to an actual deflection angle that matches the nominal angle, which in turn will tend to move the subject vehicle appropriately so that the actual distance $d_{act}$ approaches the nominal distance $d_{nom}$.

If, however, the vehicle that is driving ahead then changes its speed, the distance $d_{act}$ between the two vehicles also changes. In order to re-establish a nominal distance $d_{nom}$ between the vehicles, this distance must become larger or smaller. The distance $d_{act}$ from a vehicle that is driving ahead depends on the speed of the vehicle that is driving ahead, so that it is necessary to know the speed of the vehicle that is driving ahead in order to establish or maintain the appropriate nominal distance $d_{nom}$.

Within the method according to the embodiment of the invention which is described here, the speed of the leading vehicle that is driving ahead is calculated from the speed $v_{act}$ of the subject or host vehicle and the relative speed $v_{rel}$ of the subject vehicle relative to the leading vehicle that is driving ahead, by adding the relative speed $v_{rel}$ to the speed $v_{act}$ of the subject vehicle (or equivalently subtracting the relative speed from the actual speed, depending on the sign convention of the relative speed).

If the relative speed $v_{rel}$ is zero, both vehicles are moving at the same speed and the distance between the vehicles does not change. In order to determine the relative speed, the vehicle is equipped with suitable sensors such as radar sensors and electronics.

Figure 3:
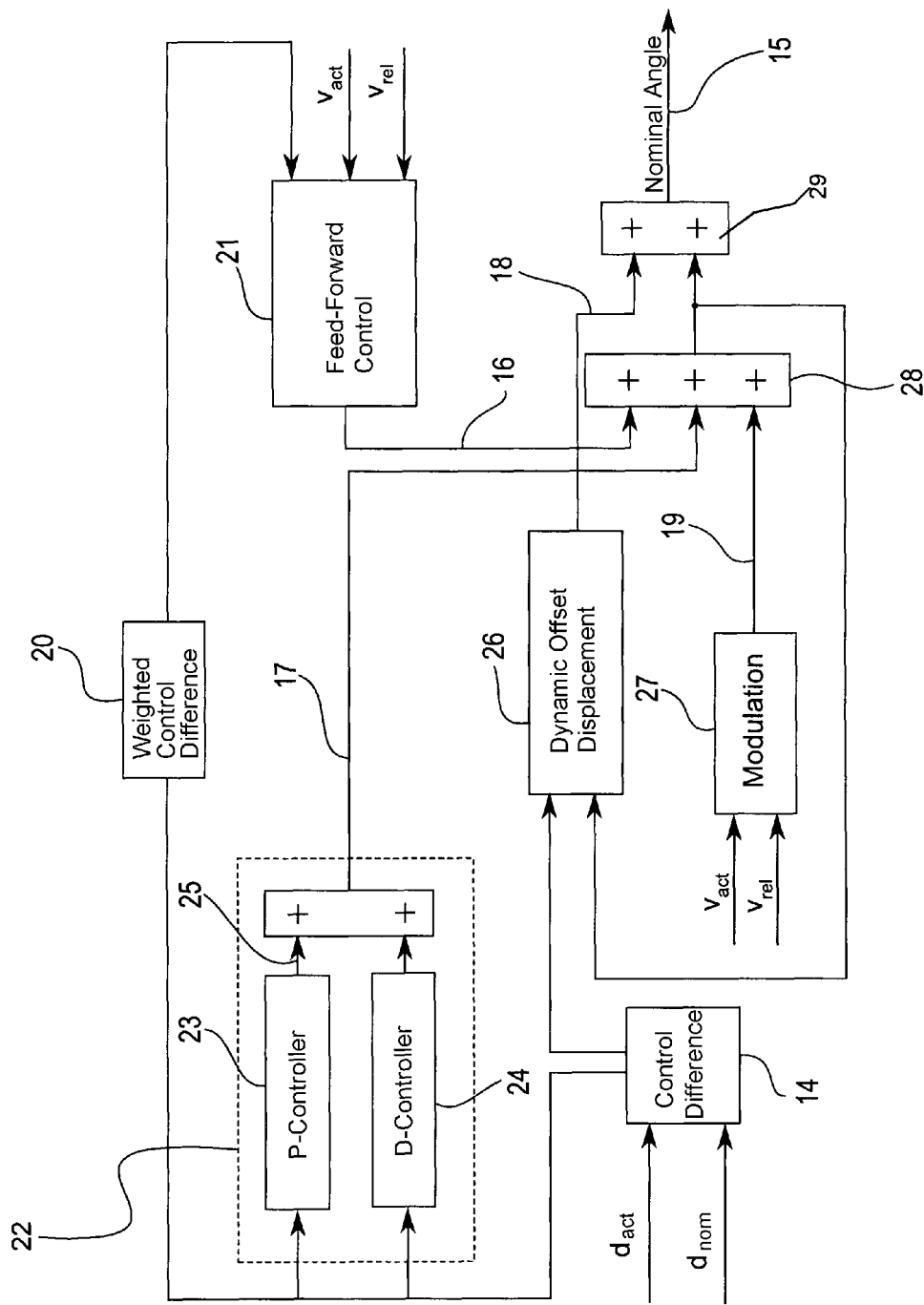
FIG. 3 shows a block diagram of a control loop of an electronic controller according to an embodiment of the invention for determining the nominal deflection angle $\phi_{nom}$ for the accelerator device.

The control concept of the electronic controller 4 for determining a nominal angle $\phi_{nom}$ according to the invention is shown in FIG. 3. One input variable of the control circuit is the actual distance $d_{act}$ which is determined between the subject vehicle and another vehicle that is driving ahead of the subject vehicle, for example, by means of a radar sensor. If no other vehicle is driving ahead of the subject vehicle, then the control concept does not apply. A nominal distance, which is referenced as $d_{nom}$, is provided by a control unit which is not shown here in more detail. The actual distance $d_{act}$ and the desired nominal distance $d_{nom}$ are provided to a difference circuit or subtractor (or summer with an inverted input) that produces a difference therebetween, referred to as the control difference 14, by which the actual distance $d_{act}$ should be reduced or increased with respect to the nominal distance $d_{nom}$. The control difference 14 constitutes one of the input signals of the control concept.

The output variable of the control concept according to this embodiment of the invention is the nominal angle $\phi_{nom}$ 15 which, according to this embodiment of the invention, comprises plural different nominal angle contributions 16,

17, 18 and 19. These values 16, 17, 18, 19 can be calculated on the basis of different algorithms as follows.

The first nominal angle contribution 16 represents the situation where a leading vehicle that is driving ahead is moving at a constant speed and the subject vehicle is to follow this vehicle at the same speed (such that $v_{rel}=0$). This control contribution 16 is determined in a feed-forward control 21 from the speed of the leading vehicle that is driving ahead, which is given by the actual speed $v_{act}$ and the relative speed $v_{rel}$, e.g. by subtracting the relative speed from the actual speed of the subject vehicle. An offset is determined as a weighted control difference 20, which results from the control difference 14 weighted or multiplied by an empirically determined constant factor. This offset 20 is added to the calculated speed of the leading vehicle in the feed-forward control 21. A deflection of the accelerator device towards a deflection angle, which corresponds to the isolated nominal angle contribution 16, would therefore result in the vehicle's engine load being adjusted such that the vehicle adopts the same speed as that of the leading vehicle that is driving ahead. The first nominal angle contribution 16 thus forms the basis of the control concept according to this embodiment of the invention.

A proportional/differential controller or PD controller 22 is provided for additionally controlling the distance, by supplying the second nominal angle contribution 17. The PD controller 22 includes a proportional controller or P-controller 23 and a differential controller or D-controller 24.

In the P-element or proportional controller 23, its input signal is amplified proportionally to produce an output signal 25. However, the amplification factor is not a constant, but instead follows a characteristic curve. The input of the proportional controller 23 is the value of the control difference 14, or distance control deviation, which is the difference between the actual following distance $d_{act}$ and the nominal or specified following distance $d_{nom}$ as described above.

The D-element or differential controller 24 is a differentiator which responds to the change in the control difference 14 over time, i.e. to the time derivative of this input variable which changes dynamically. Namely, the differential controller 24 determines and amplifies the time derivative of the following distance control deviation or control difference 14. The process according to this embodiment of the invention is particularly that the pedal angle contribution is additionally attenuated or amplified as a function of the magnitude of the time derivative of the control difference 14. As a result of this, a turbulent or rapidly fluctuating control is prevented during the incorporation of the differential contribution into the second nominal angle contribution 17, in order to make the vehicle driver feel that the accelerator device 1 is behaving smoothly and harmoniously during the actuation thereof.

The PD-controller 22 produces the second nominal angle contribution 17 by superposition or e.g. addition of the respective output values of the P-controller 23 and the D-controller 24.

In addition to the first and second nominal angle contributions 16 and 17 described above, a third nominal angle contribution 18 is provided, which takes account of the curve shape and the gradient of the route. If the vehicle is following a rising path curve or trajectory, as is the case, for example, in a hilly or mountainous landscape, the vehicle driver must additionally increase his vehicle's engine load, in order to maintain his speed, and/or reduce the engine load, if the path curve or trajectory slopes downwards.

This is taken into account by an electronic controller or control unit 26, and particularly in the corresponding nominal angle contribution 18 produced by the control unit 26. The value of the following distance control deviation, i.e. the control difference 14, or especially its magnitude, is continually compared with a particular threshold, and only when this preset threshold is exceeded does the control unit 26 for determining an additional nominal angle contribution 18 become effective. The resulting nominal angle contribution 18 produces an offset shift value or displacement with respect to the other nominal angle contributions 16, 17, wherein this can either take the form of an addition or a subtraction (or summing of a positive value or a negative value) in incremental steps.

Moving off situations, i.e. situations of beginning to drive off from a standstill, which occur for instance at traffic lights, are taken account of by a modulation of the nominal angle $\phi_{nom}$ in a fourth control loop 27. When the vehicle starts to drive and moves off, for example, when a set of traffic lights changes from red to green, the actual distance $d_{act}$ between two vehicles can be less than a threshold, and can be significantly less than the nominal distance $d_{nom}$. However, since it would result in unwanted delays in traffic, if the subject vehicle were to only begin to move off once the nominal distance $d_{nom}$ (which is to be observed with respect to the leading vehicle that is driving ahead) were attained, the aim according to this embodiment of the invention for these traffic situations, is to displace or shift the nominal angle $\phi_{nom}$ 15 in the direction of a greater nominal angle by means of the control loop 27 so as to begin accelerating the subject vehicle even before the actual distance grows to the nominal distance. This modulation is based on the subject vehicle's actual speed $v_{act}$ and relative speed $v_{rel}$ compared to the leading vehicle, as inputs to the control loop 27. This results in an output providing a further nominal angle contribution 19.

All of the nominal angle contributions 16, 17, 18 and 19 are merged to give a total in respective totalizers, summing circuits or adders, or other appropriate signal value merger circuits 28 and 29, to ultimately produce the nominal angle $\phi_{nom}$ 15. In the illustrated embodiment, the contributions 16, 17 and 19 are additively merged in the totalizer element 28, and the output of the totalizer element 28 is additively merged with the contribution 18 in the totalizer element 29 to produce the nominal angle 15 at the output of the totalizer element 28. The intermediate output of the totalizer element 28 is also provided as an input to the dynamic offset displacement control unit 26, which monitors the variation of the other contributions 16, 17 and/or optionally 19 to take account thereof in producing the offset shift or displacement value of the contribution 18 as a function of the contributions 16, 17 and/or 19.

Within the control concept according to the invention it is thus guaranteed by various algorithms that a nominal angle 15 of the accelerator device 1 is calculated, which will result in a given nominal following distance $d_{nom}$ between the leading vehicle and the subject vehicle in the manner described previously. In the final analysis, the control of the nominal following distance is attained by the targeted variation of the subject vehicle's speed $v_{act}$ by adjusting the engine load.

As the relative speed $v_{rel}$ of the subject vehicle relative to the leading vehicle that is driving ahead constantly changes over time, depending on the actual speed $v_{act}$ of the subject vehicle and the speed of the leading vehicle that is driving ahead, the nominal distance $d_{nom}$ also changes, as does the value of the nominal angle $\phi_{nom}$ to be changed by the dynamic control process described.

However, the method is designed such that it is always possible, in an appropriate traffic situation, for the vehicle driver to ignore the modulation of the restoring force and to actuate the accelerator device 1 towards greater deflections.

Figure 4:
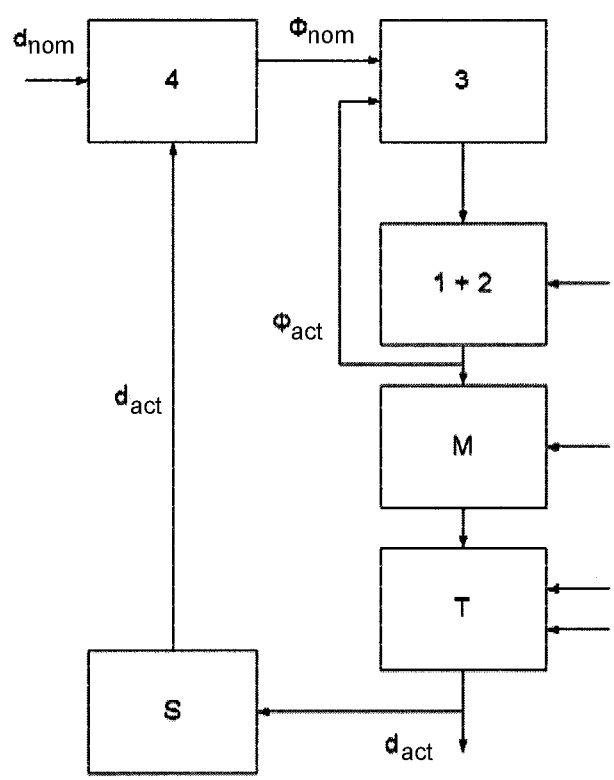
FIG. 4 shows a block diagram of the entire control loop including the electronic controller, the accelerator device and its associated actuator arrangement, as well as the motor controller of the motor vehicle.

FIG. 4 shows the control loop which can be constructed with mostly known available components, including a distance sensor S, an electronic engine or motor controller M (e.g. an ECU), and an electronic controller or processor T (e.g. of a driver assistance system) that receives signals from suitable environment sensors and other sensors and from these signals detects, represents and evaluates the complex driving situation involving and around the subject motor vehicle on the road, and wherein the control loop further includes the electronic controller 4 according to an embodiment of the invention as shown and described in connection with FIG. 3. The nominal distance $d_{nom}$ determined as described above and the actual distance $d_{act}$ measured by the sensor S are supplied to the controller 4 as reference or input variables, and the specified or nominal angle $\phi_{nom}$ for the accelerator pedal is determined therefrom by the controller 4 in the control loop.

This nominal angle $\phi_{nom}$ is supplied from the controller 4 to the pedal actuating or controlling element 3. The AFFP (accelerator force feedback pedal) actuator and pedal together form a unit 1+2. An actual pedal angle $\phi_{act}$ is produced, e.g. sensed by a suitable angle or position sensor, and the actual pedal angle $\phi_{act}$ is supplied to the vehicle's engine controller M, as well as being fed back to the pedal actuating or controlling element 3. Of course, the driver of the subject vehicle is an influencing variable, as he can react to the signal (e.g. the feedback signal via the restoring force adjustment) from the AFFP, but does not have to and can, of course, also have an effect on the pedal angle for other reasons. From the engine controller M, the control loop merges into (e.g. has an influence on) the complex driving situation including and around the subject vehicle on the road, as represented in the electronic controller or processor T, wherein the actual distance $d_{act}$ that thereby arises between the subject vehicle and the other vehicle driving ahead of the subject vehicle in the complex driving situation is also known to depend on the road behavior of the other vehicle as well as the entire driving, road and traffic situation. However, this actual distance $d_{act}$ is detected by the distance sensor S and is then fed back to the controller 4 according to the invention, which enables the inventive objects and advantages to be achieved.

In at least one embodiment of the invention, any or all electronic controllers can be embodied or implemented respectively in an electronic circuit, which may comprise at least one processor, and which is configured and programmed to implement the steps and functions of algorithms and processes as disclosed herein, by executing a suitable software program in the processor for performing the disclosed steps and functions, and/or by suitable electronic and/or electrical hardware elements and circuit connections for performing the disclosed steps and functions. When a component is "configured" to perform a certain feature (e.g. function, method, algorithm or step), then the component includes the necessary hardware elements arranged in the necessary manner to mechanically perform the recited feature or to execute a software routine or program that performs or causes the performance of the recited feature. To the extent necessary, the component includes a physical machine-readable memory or data storage medium storing the respective software routine or program, and a processor and further circuit elements that execute the software routine or program.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

LIST OF REFERENCE NUMERALS

1 Accelerator device (accelerator pedal)
2 Actuator
3 Controlling or actuating element
4 Electronic controller
5 Pedal pad
6 Pedal lever
7 Drive shaft
8 Driver roll
9 Arm
10 Housing
11 Interface
12 Return spring
13 Journal
14 Control difference
15 Nominal angle
16 Nominal angle contribution
17 Nominal angle contribution
18 Nominal angle contribution
19 Nominal angle contribution
20 Offset or weighted control difference
21 Feed-forward control
22 PD controller
23 P controller
24 D controller
25 Output signal
26 Offset displacement
27 Modulation
28 Totalizer
29 Totalizer
A Pivot axis of actuator
M Engine or motor controller
P Pivot axis of pedal
S Distance sensor
T Controller or processor evaluating driving situation

What is claimed is:

1. A method of operating an accelerator device in a subject vehicle, wherein a driver of the subject vehicle applies a driver's actuation force to the accelerator device to deflect the accelerator device to a deflected position, and the accelerator device outputs a control signal that is dependent on the deflected position and is used to control a drive power, a drive torque or a drive speed of a drive motor of the subject vehicle, wherein the method comprises:
   a) with two or more sensors, determining an actual speed of the subject vehicle, a relative speed of the subject vehicle relative to a leading vehicle ahead of the subject vehicle, and an actual distance between the subject vehicle and the leading vehicle;
   b) obtaining a specified distance value;
   c) with a deflection sensor, determining an actual deflection of the accelerator device in the deflected position thereof;

d) with at least one electronic controller, producing a control difference as a difference between the actual distance and the specified distance value, weighting the control difference to produce a weighted control difference, producing a first control contribution based on the actual speed, the relative speed and the weighted control difference, producing a second control contribution based on the control difference, and determining a specified deflection value for the accelerator device by summing at least the first control contribution and the second control contribution;

e) determining a deflection difference between the actual deflection and the specified deflection value; and f) with an actuator arrangement, applying to the accelerator device a restoring force directed opposite the actuation force, and modulating the restoring force as a function of the deflection difference.

2. The method according to claim 1, wherein the at least one controller includes a feed-forward control, wherein the weighting of the control difference comprises multiplying the control difference by a constant factor to give the weighted control difference, and wherein the producing of the first control contribution is performed by the feed-forward control and comprises determining a speed of the leading vehicle by adding or subtracting the relative speed and the actual speed of the subject vehicle, and adding the weighted control difference to the speed of the leading vehicle to give the first control contribution.

3. The method according to claim 1,
wherein the at least one controller comprises a PD-controller that includes a proportional controller, a differential controller and an adder, and
wherein the producing of the second control contribution is performed by the PD-controller and comprises amplifying the control difference by a variable amplification factor that is specified by a characteristic curve in the proportional controller to produce a first value, determining and amplifying a time derivative of the control difference in the differential controller to produce a second value, and adding the first value and the second value in the adder to produce the second control contribution.

4. The method according to claim 1,
wherein the step d) further comprises comparing an absolute value of the control difference to a threshold value, and when the absolute value of the control difference exceeds the threshold value then producing a third control contribution as a positive offset value when the control difference is positive or as a negative offset value when the control difference is negative, and
wherein the determining of the specified deflection value further includes summing the third control contribution together with the first control contribution and the second control contribution.

5. The method according to claim 4, wherein the positive or negative offset value of the third control contribution is produced as a function of an intermediate result of the summing of at least the first control contribution and the second control contribution without the third control contribution.

6. The method according to claim 5, wherein the summing of the third control contribution together with the first control contribution and the second control contribution comprises summing the third control contribution with the intermediate result.

7. The method according to claim 5, wherein the step d) further comprises producing a fourth control contribution as a function of the actual speed and the relative speed, and wherein the intermediate result is produced by the summing of the first control contribution, the second control contribution and the fourth control contribution.

8. The method according to claim 7, further comprising comparing the actual speed and the actual distance to respective threshold values, and wherein the producing of the fourth control contribution is performed only when the actual speed and the actual distance are below the respective threshold values.

9. The method according to claim 1, wherein the step d) further comprises producing a fourth control contribution as a function of the actual speed and the relative speed, and wherein the determining of the specified deflection value further includes summing the fourth control contribution together with the first control contribution and the second control contribution.

10. The method according to claim 9, further comprising comparing the actual speed and the actual distance to respective threshold values, and wherein the producing of the fourth control contribution is performed only when the actual speed and the actual distance are below the respective threshold values.

11. An electronic controller for an accelerator device in a subject vehicle, wherein a driver of the subject vehicle applies a driver's actuation force to the accelerator device to deflect the accelerator device to a deflected position that is a control indication of the driver's desired drive power, drive torque or drive speed of a drive motor of the subject vehicle, wherein the electronic controller comprises:

an actual speed input for a signal representing an actual speed of the motor vehicle, a relative speed input for a signal representing a relative speed of the subject vehicle relative to a leading vehicle ahead of the subject vehicle, an actual distance input for a signal representing an actual distance between the subject vehicle and the leading vehicle, a specified distance value input for a signal representing a specified distance value, a differencing circuit element that is connected to the actual distance input and the specified distance value input, and that produces a control difference as a difference between the actual distance and the specified distance value at an output of the differencing circuit element, a weighting circuit element that is connected to the output of the differencing circuit element, and that produces a weighted control difference at an output of the weighting circuit element, a feed-forward control that is connected to the actual speed input, the relative speed input and the output of the weighting circuit element, and that produces a first control contribution based on the actual speed, the relative speed and the weighted control difference at an output of the feed-forward control, a PD-controller that is connected to the output of the differencing circuit element, and that produces a second control contribution based on the control difference at an output of the PD-controller, and a totalizer arrangement that is connected to at least the output of the feed-forward control and the output of the PD-controller, and that sums at least the first control contribution and the second control contribution to produce, at an output of the totalizer arrangement being an output of the electronic controller, a specified deflection value signal representing a specified deflection value for the accelerator device.

12. The electronic controller according to claim 11, wherein the weighting circuit element is configured to multiply the control difference by a constant factor to produce the weighted control difference, and wherein the feed-forward control is configured to determine a speed of the leading vehicle by subtracting or adding the relative speed and the actual speed of the subject vehicle, and to add the weighted control difference to the speed of the leading vehicle to produce the first control contribution.

13. The electronic controller according to claim 11, wherein
the PD-controller comprises a proportional controller, a differential controller and an adder,
the proportional controller is configured to amplify the control difference by a variable amplification factor that is specified by a characteristic curve in the proportional controller to produce a first value,
the differential controller is configured to determine and amplify a time derivative of the control difference to produce a second value, and
the adder is connected to the proportional controller and the differential controller and configured to add the first value and the second value to produce the second control contribution.

14. The electronic controller according to claim 11, further comprising a dynamic offset circuit that has an input connected to the output of the differencing circuit element and an output connected to the totalizer arrangement,
wherein the dynamic offset circuit is configured to compare an absolute value of the control difference to a threshold value, and when the absolute value of the control difference exceeds the threshold value then to produce, at the output of the dynamic offset circuit, a third control contribution as a positive offset value when the control difference is positive or as a negative offset value when the control difference is negative, and
wherein the totalizer arrangement is configured to sum the third control contribution together with the first control contribution and the second control contribution to produce the specified deflection value signal.

15. The electronic controller according to claim 14, wherein the totalizer arrangement comprises a first adder having a first input connected to the output of the feed-forward control, a second input connected to the output of the PD-controller, and an output connected to another input of the dynamic offset circuit,
wherein the first adder is configured to sum at least the first control contribution and the second control contribution without the third control contribution to produce an intermediate result at the output of the first adder, and
wherein the dynamic offset circuit is configured to produce the positive or negative offset value of the third control contribution as a function of the intermediate result.

16. The electronic controller according to claim 15, wherein the totalizer arrangement further comprises a second adder having a first input connected to the output of the dynamic offset circuit, a second input connected to the output of the first adder, and an output being the output of the totalizer arrangement, and wherein the second adder is configured to sum the third control contribution and the intermediate result to produce the specified deflection value signal at the output of the second adder.

17. The electronic controller according to claim 15, wherein the first adder of the totalizer arrangement further has a third input,
further comprising a modulation circuit having an input connected to the actual speed input, an input connected to the relative speed input, and an output connected to the third input of the first adder,
wherein the modulation circuit is configured to produce a fourth control contribution at the output of the modulation circuit as a function of the actual speed and the relative speed, and
wherein the first adder is configured to sum the first control contribution, the second control contribution and the fourth control contribution to produce the intermediate result.

18. The electronic controller according to claim 17, wherein the modulation circuit further has an input connected to the actual distance input, the modulation circuit is configured to compare the actual speed to a speed threshold, the modulation circuit is configured to compare the actual distance to a distance threshold, and the modulation circuit is configured to produce the fourth control contribution only when the actual speed falls below the speed threshold and the actual distance falls below the distance threshold.

19. The electronic controller according to claim 11, further comprising a modulation circuit having an input connected to the actual speed input, an input connected to the relative speed input, and an output connected to the totalizer arrangement,
wherein the modulation circuit is configured to produce a fourth control contribution at the output of the modulation circuit as a function of the actual speed and the relative speed, and
wherein the totalizer arrangement is configured to sum the first control contribution, the second control contribution and the fourth control contribution to produce the specified deflection value signal at the output of the totalizer arrangement.

20. A control system comprising the electronic controller according to claim 11, and further comprising:
the accelerator device,
sensor systems that are arranged on the subject vehicle, and that have outputs connected respectively to the actual speed input, the relative speed input and the actual distance input of the electronic controller, and that are configured respectively to produce the signal representing the actual speed, the signal representing the relative speed, and the signal representing the actual distance,
a deflection sensor that is configured and arranged to detect an actual deflection of the accelerator device in the deflected position thereof, and to produce an actual deflection signal representing the actual deflection,
a following distance controller that has an output connected to the specified distance value input of the electronic controller, and that is configured to produce the signal representing the specified distance value,
a restoring force controller that has inputs respectively connected to the deflection sensor and the output of the electronic controller, and that is configured and arranged to determine a deflection difference between the actual deflection and the specified deflection value, and to produce a restoring force control signal as a function of the deflection difference, and an actuator arrangement that is connected to the restoring force controller, and that is operatively coupled to the accelerator device, and configured and arranged to apply to the accelerator device a restoring force directed opposite the driver's actuation force, and to modulate the restoring force in response to and dependent on the restoring force control signal.

21. A controller for a control system for a subject motor vehicle for determining a specified angle value for an accelerator device, wherein the accelerator device is an accelerator pedal or a twist-grip throttle and wherein the accelerator device can be deflected from a starting position by the application of an actuation force to the accelerator device, and wherein the controller comprises inputs for supplying signals of an actual speed of the subject motor vehicle, a relative speed of the subject motor vehicle relative to an other motor vehicle that is driving ahead of the subject vehicle, a specified distance value from the other motor vehicle that is driving ahead, and an actual distance from the other motor vehicle that is driving ahead, characterized in that the controller includes:

a PD controller, configured to generate a first specified angle value contribution based on a difference between the specified distance value and the actual distance, a feed-forward control which is parallel to the PD controller, and is configured to generate a second specified angle value contribution based on the actual speed, the relative speed, and a weighted deviation of the actual distance from the specified distance value, and a totalizer configured to determine the specified angle value from at least the first and second angle value contributions.

* * * * *